United States Patent [19]

Miller

[11] 3,963,798

[45] June 15, 1976

[54] THIXOTROPIC, RADIATION CURABLE COMPOSITIONS

[75] Inventor: Lewis S. Miller, Bellevue, Wash.

[73] Assignee: The Dow Chemical Company, Midland, Mich.

[22] Filed: June 14, 1974

[21] Appl. No.: 479,295

Related U.S. Application Data

[60] Division of Ser. No. 304,222, Nov. 6, 1972, Pat. No. 3,839,076, which is a continuation-in-part of Ser. No. 93,855, Nov. 30, 1970, abandoned.

[52] U.S. Cl. ............... 260/837 R; 204/159.24; 204/159.15; 204/159.16; 204/159.19; 260/42.29; 260/77.5 CR; 260/42.53; 260/827; 260/836; 260/859 R; 260/861; 260/863; 260/885; 427/44; 427/386; 427/393; 428/425; 428/537; 526/12; 526/26; 526/317

[51] Int. Cl.$^2$ ............................................ C08L 63/00

[58] Field of Search .......... 260/37 EP, 836, 837 R, 260/78.5 UA, 77.5 UR; 204/159.15, 159.16, 159.24, 159.23; 117/93.31

[56] References Cited
UNITED STATES PATENTS

| | | | |
|---|---|---|---|
| 3,367,992 | 2/1968 | Bearden | 260/837 |
| 3,437,514 | 4/1969 | Burlant | 117/93.31 |
| 3,466,259 | 9/1969 | Jernigan | 260/37 |
| 3,839,076 | 10/1974 | Miller | 117/93.31 |
| R27,656 | 6/1973 | Miller | 117/93.31 |

*Primary Examiner*—Richard B. Turer
*Attorney, Agent, or Firm*—Christensen, O'Connor, Garrison & Havelka

[57] ABSTRACT

A reactive metal oxide or metal hydroxide, such as ZnO, MgO, HgO or Ba(OH)$_2$ and acrylic or methacrylic acid are added to a liquid, hydrophobic, essentially solvent-free coating vehicle capable of being cured by high-energy radiation. The resulting coating composition, as compared to the vehicle alone, can be cured with lower radiation doses, is less susceptible to oxygen inhibition of curing with ionizing radiation and exhibits a thixotropic viscosity which prevents excessive penetration of the coating into porous substrates and contributes non-drip, low-flow characteristics to the composition.

17 Claims, No Drawings

THIXOTROPIC, RADIATION CURABLE COMPOSITIONS

RELATED APPLICATION

This application is a divisional of my copending application Ser. No. 304,222, filed Nov. 6, 1972 (U.S. Pat. No. 3,839,076), which is in turn a continuation-in-part of my copending application Ser. No. 93,855, filed Nov. 30, 1970 (now abandoned).

BACKGROUND OF THE INVENTION

This invention relates to coating compositions curable by exposure to high-energy radiation.

It is known that high-energy radiation can be used to effect curing of polymerizable liquid polymers, monomers and solutions and dispersions of polymers in monomers. It is also known that high-energy radiation has a number of distinct advantages over conventional methods of effecting polymerization and cross-linking using catalytic agents only. High-energy radiation is especially useful for the curing of coatings on wood and wood products, fabrics, rubber, glass, metal and similar substrates. Through its use the sometimes lengthy induction period associated with catalyst-induced curing can be avoided, compositions having indefinite pot lives can be employed and, in many instances, superior coating-to-substrate bonding can be achieved.

To enable the use of high-energy radiation curing to best advantage, coating compositions are needed which are capable of being rapidly cured at reasonable dose rates, which give good single coat coverage and which do not excessively penetrate porous substrates. For application to vertical surfaces, non-drip, low-flow compositions are essential. When high-energy ionizing radiation, such as an electron beam, is to be employed in air, it is also desirable that the composition have a high viscosity which minimizes oxygen absorption and oxygen inhibition of curing at the surface of the coating.

SUMMARY OF THE INVENTION

This invention is directed to thixotropic coating compositions capable of being rapidly cured by exposure to high-energy radiation. These compositions are produced by incorporating into a liquid, hydrophobic, essentially solvent-free coating vehicle curable by exposure to high-energy radiation and essentially free of reactive carboxylic acid groups 1 an additive selected from the group consisting of metal oxides and metal hydroxides, said additive being dispersible in said vehicle in a finely divided state and 2 an acid selected from the group consisting of acrylic acid and methacrylic acid, the additive being reactive with the acid to form a metal salt thereof and water and being substantially non-inhibitory of curing of said composition by exposure to high-energy radiation and the amounts of additive and acid being sufficient to render the composition thixotropic. The additive and acid in these compositions react to form a metal salt and minute water droplets. Since the resulting water solution of the metal salt is substantially insoluble in the hydrophobic vehicle, there results a two-phase dispersion having markedly different viscosity properties than the vehicle alone.

Thus, the compositions of this invention comprise (1) a first phase comprising a liquid, hydrophobic, essentially solvent-free coating vehicle curable by exposure to high-energy radiation and essentially free of reactive carboxylic acid groups and (2) a second phase dispered in said first phase and comprising water and a metal salt of acrylic acid or methacrylic acid, the salt being substantially non-inhibitory of curing of said composition by exposure to high-energy radiation.

The thixotropy exhibited by these compositions renders them especially useful for application to porous substrates such as unsealed wood; good single-coat coverage without excessive penetration can be obtained. These compositions can be roll-coated to give a variety of surface coating textures, and because of their non-drip, low-flow characteristics, are particularly well suited for application to vertical surfaces. The high viscosity also minimizes oxygen absorption into the coating surface, and as a consequence, little or no oxygen inhibition of curing occurs at the surface of the coating when high-energy ionizing radiation is used. Moreover, as compared to the coating vehicle alone, these compositions are more easily curable by exposure to high-energy radiation.

DETAILED DESCRIPTION OF THE INVENTION

The vehicle used in the compositions of this invention can be any liquid, hydrophobic, essentially solvent-free system which is curable by exposure to high-energy radiation, is essentially free of reactive carboxylic acid groups and comprises a polymer, monomer or a solution or dispersion of polymer in monomer. As used herein and in the appended claims, the term "liquid" is intended to mean "liquid at ambient temperature." Polymers of acrylate esters, epoxy-acrylates, vinyl esters, and solutions thereof in monomers of a similer type are exemplary of polymercontaining vehicles that can be used.

Specific resins that can be used are epoxy-acrylates such as those sold under the trademark Epocril E-11 (Shell Chemical Co.), or solutions of these resins in styrene or acrylate ester monomers; acrylic monomer-polymer syrups such as poly-n-butylmethacrylate dissolved in monomeric n-butyl methacrylate, monomers such as vinyl acetate, vinyl pyrrolidone, ethyl acrylate, ethylene dimethacrylate, and mixtures of these.

Other vehicles useful in this invention are certain of the alpha-beta, olefinically unsaturated organic resins disclosed in U.S. Pat. No. 3,437,514, which is incorporated herein by reference. These include acrylic resins, modified-acrylic resins, urethanemodified organic resins, silicone-modified organic resins, and epoxy resins.

It is known that certain polyester resins and vinyl ester resins containing reactive carboxylic acid functionalities can be chemically thickened by the addition thereto of metal oxides or hydroxides to form molding masses of extremely high viscosities (e.g., see U.S. Pat. Nos. 3,390,205; 3,466,259; and 3,538,188). This type of thickening results from cross-linking between polymeric species in the resin due to reaction of the metal oxide or hydroxide with the carboxylic acid groups. Incorporation of a relatively small amount of metal oxide or hydroxide and acrylic or methacrylic acid into such resins results in coating compositions which are viscous, exhibit varying degrees of thixotropy, are more rapidly curable by high-energy radiation and are less susceptible to oxygen inhibition of curing. Usually, however, these compositions are not storage stable because their viscosities generally increase to unacceptable levels with time due to the occurrence of chemical thickening as described above, the rate of chemical thickening being dependent on the particular resin being used and on the amount and reactivity of the metal oxide or hydroxide employed (magnesium oxide being very reactive). In some instances it may be necessary to use the coating composition immediately after it is prepared.

In contrast to the type of resins just discussed, those used in the compositions of this invention are essentially free of reactive carboxyl groups (i.e., are not chemically thickenable by reaction with metal oxides and hydroxides). Coating compositions of this invention exhibit stable viscosities and good storage life. Furthermore, they can contain large quantities of metal oxide or hydroxide and exhibit a greater degree of thixotropy than do compositions prepared from resins of the type which can be chemically thickened.

An especially preferred class of vehicles for use in this invention are acrylate ester resins produced either (1) by reacting a polyfunctional material selected from the group consisting of (a) dicarboxylic acids and dicarboxylic acid chlorides having from 4 to 15 carbon atoms, and (b) polyfunctional isocyanates having terminal, reactive isocyanate groups with a compound selected from the group consisting of 2-hydroxyalkyl acrylates and 2-hydroxyalkyl methacrylates; or (2) by reacting a half-ester of a 2-hydroxyalkyl acrylate or 2-hydroxyalkyl methacrylate and a dibasic acid with a polyepoxide. These resins are disclosed in detail in U.S. Pat. No. 3,367,992 and in my U.S. Application Ser. No. 193,580, filed Oct. 28, 1971, which patent and application are incorporated herein by reference. These resins may be used undiluted or dissolved in vinyl momoner which copolymerizes with the resin upon exposure to high-energy radiation.

Typical of monomers that can be used in the vehicles of this invention are styrene, n-butylacrylate, 2-ethylhexylacrylate, methyl methacrylate, vinyl acetate, vinyl toluene, ethylene glycol dimethacrylate, and combinations thereof. Water-soluble monomers such as 2-hydroxyethyl acrylate and diacetone acrylamide can be used in minor proportions with water insoluble monomers like butyl acrylate.

The metal oxides and hydroxides (which are sometimes referred to herein merely as "additives") useful in the compositions of this invention are those which are dispersible in the vehicle in a finely divided state and which will react with acrylic acid or methacrylic acid to produce a metal salt of the acid and water. The preferred additives are ZnO, MgO, CaO, SrO, BaO, HgO, PbO, $Pb_3O_4$ and the hydroxides corresponding thereto. Other useful additives include CuO, CdO, NiO, $Sb_2O_3$, $Bi_2O_3$, $Cr_2O_3$, $MnO_2$, $SnO_2$, $ZrO_2$, $Fe_2O_3$, $Co_2O_3$ and the hydroxides corresponding thereto. Alkali metal oxides and hydroxides are also useful when dispersible in the vehicle in a finely divided state. Mixtures of metal oxides and/or hydroxides can also be used. Tack-free coatings have consistently been obtained upon electron beam irradiation in air of coating compositions in which HgO, CdO, $Fe_2O_3$, $Pb_3O_4$ or $Ba(OH)_2$ and acrylic or methacrylic acid have been incorporated.

Titanium dioxide ($TiO_2$) is one metal oxide which is ineffective, apparently because it is not sufficiently reactive with acrylic or methacrylic acid. Strong reducing oxides such as cuprous oxide ($Cu_2O$) and stannous oxide (SnO) and very powerful oxidizing oxides such as chromic oxide ($CrO_3$) also have been found to be ineffective, apparently because they inhibit curing in some manner.

The additive should be reduced to a finely divided state prior to incorporation into the vehicle. Good results have been obtained using additives in commercially available powdered forms which are usually from (−)60 to (−)100 mesh. At least about 0.5% by weight of the additive based on the total weight of the coating composition is ordinarily necessary to achieve a substantial viscosity increase. The use of at least 3% by weight of additive will generally be preferred.

The amounts of additive and acid necessary to yield a coating composition of a particular viscosity can be readily determined by experimentation and will depend on the type of vehicle, its viscosity and the reactivity of the additive and acid.

The acrylic and methacrylic acids used in the compositions of this invention are most effective when used in a proportion of one mole of acid per equivalent of additive. Greater proportions can also be used, including proportions at which the acid becomes a comonomer which influences the properties of the cured coating composition. Thixotropic compositions can be obtained using lesser amounts of the acid, but at least the lesser of (a) 0.3 mole of acid per equivalent of metal oxide and (b) 0.5% by weight of the total composition is ordinarily required. The former minimum will usually apply when a minimum of additive is used, and the latter when large amounts of additive are used. The upper limit of the acid and additive addition is dictated only by the application and use requirements of the coating. It will usually be preferred that the amounts and proportions of additive and acid be such as to provide a composition having a viscosity of from 50,000 to 500,000 cps. Up to 33% by weight combined additive and acid has been utilized satisfactorily. Normally, from 5 to 10% of the weight of the coating composition will be comprised of additive and acid.

The acid and oxide can be incorporated into the coating vehicle in either order. Ordinarily, the two should not be premixed because an exothermic reaction and a semisolid mass which cannot be adequately dispersed can result. Cure rate increases and viscosity increases can be achieved by incorporating a finely divided metal salt of acrylic or methacrylic acid and approximately one equivalent of water into the coating vehicle. However, the viscosity increase achieved is far less than is achieved by incorporating the acid and additive separately.

Conventional paint mixing equipment is usually adequate for dispersion of the acid and additive in the coating vehicle. Mixing is ordinarily conducted at room temperature or slightly above, but moderately elevated temperatures are not detrimental. When vehicles which are free of reactive carboxyl groups are used, viscosity increases usually cease as soon as thorough dispersion has been obtained, usually within from about 5 to 30 minutes using the preferred acrylic acid.

The expression "high-energy radiation" as used herein is intended to include both particulate and electromagnetic radiation; for example, highly accelerated electrons or nuclear particles, such as protons, neutrons, alpha particles, deuterons and beta particles; and x-rays, gamma rays and high-energy ultraviolet light. High-energy ultraviolet light is effective for the curing of relatively thin, clear or translucent coating. The particles may be accelerated to high speeds by any number of known means, such as a cyclotron or Van de Graaff generator. Effective results have been obtained, for example, using high-energy electrons of from 20,000 to 10,000,000 electron volts emitted from a Van de Graaff generator at dose rates of from 1 megarad per minute to 10 megarads per second.

Temperatures which can be used during irradiation are limited only by the stability of the substrate and the stability and volatility of the liquid coating. Generally, temperatures ranging from 0° to 100°C., and preferably 15° to 80°C., are used.

Substrates to which the compositions of this invention can be applied include for example paper; wood products such as lumber, veneer, plywood, particleboard and hardboard; and metals such as aluminum. These compositions can be used for example as clear or pigmented coatings on wood and metal, both for interior and exterior use, and as inks which can be applied by letter presses.

The following examples are provided by way of illustration only and are not intended to be limiting of the invention in any way. All parts and percentages are by weight, and all metal oxides and hydroxides are used in powdered form.

EXAMPLE 1 a. A pigmented base coating composition is formulated from 17.5 parts of a resin (A) produced by reacting the half-ester condensation product of 2 moles of 2-hydroxyethyl acrylate and 2 moles maleic anhydride with 1 mole bisphenol A diglycidyl ether; 17.5 parts of the resinous condensation product (B) produced by reacting the half-ester condensation product of 2 moles 2-hydroxypropyl acrylate and 2 moles of maleic anhydride with 1 mole n-butanediol diglycidyl ether; 15 parts of n-butylacrylate; 31 parts of titanium dioxide and 19 parts of calcium carbonate. Similar coatings are prepared from (1) the above formulation with 10% zinc oxide added, (2) the above formulation with 10% acrylic acid added and (3) the above formulation with 10% zinc oxide and 10% acrylic acid added (approximately 0.56 mole acrylic acid per equivalent of zinc oxide). Formulation (3) becomes very thick after approximately five minutes, while the viscosities of formulations (1) and (2) remain essentially unchanged even upon prolonged standing. require Each of these formulations is spread onto a separate plywood panel with a draw bar to a thickness of 0.005 inch. The coated panels are then cured in air by passing them at 100 feet per minute under the beam of an electron accelerator operating at 300 kilovolts and 20 milliamps. A dose of 1.7 megarads per pass is absorbed. After each pass, the degree of coating cure is estimated by moderate scraping with the edge of a coin. Cure is considered incomplete if the coating is removed. The base formulation and formulations (1) and (2) each require three passes, or 5.1 megarads, to attain a hard coating while formulation (3) is hard after only one pass.

b. Formulation (3) is coated on plywood as described above and is then irradiated in air at 300 kv and 10 milliamps and with one pass at 100 feet per minute (0.85 megarad). The resulting coating is sufficiently cured to resist the coin scratch test.

EXAMPLE 2

A pigmented formulation is prepared from 20 parts of resin A of Example 1(a), 20 parts of resin B of Example 1(a), 10 parts butyl acrylate, 31 parts titanium dioxide, 19 parts of calcium carbonate and 5 parts of diacetone acrylamide. Coating compositions formulated from this base formulation, acrylic acid and the additives listed in the following table are applied to plywood panels, cured and tested as described in Example 1(a).

TABLE

| Acid | | Additives | Moles of Acid/ Equivalent of Additive | Minimum Dose to Harden (megarads) |
|---|---|---|---|---|
| Base Mix (Control) | | — | | 5.1 (3 passes) |
| Acrylic acid | 10%* | ZnO | 0.5 | 1.7 (1 pass) |
| " | 20 | ZnO | 1.0 | 1.7 |
| " | 0.5 | ZnO | 1.0 | 5.1 |
| " | 1.0 | ZnO | 1.0 | 3.4 (2 passes) |
| " | 5.0 | ZnO | 1.0 | 3.4 |
| " | 10 | MgO | 1.0 | 1.7 |
| " | 20 | $Sb_2O_3$ | 0.67 | 3.4 |
| " | 20 | HgO | 1.0 | 1.7** |
| " | 20 | $Cr_2O_3$ | 0.67 | 3.4 |
| " | 20 | CuO | 1.0 | 3.4 |
| " | 20 | $Fe_2O_3$ | 0.67 | 3.4** |
| " | 20 | $SnO_2$ | 0.5 | 3.4 |
| " | 20 | $MnO_2$ | 0.5 | 3.4 |
| " | 20 | CdO | 1.0 | 3.4** |
| " | 20 | $Pb_3O_4$ | 0.75 | 1.7** |
| " | 20 | NiO | 1.0 | 3.4 |
| " | 20 | $Co_2O_3$ | 0.67 | 3.4 |
| " | 20 | $Ba(OH)_2$ | 1.0 | 1.7** |

*The percentage of acid is based on the weight of the total composition before addition of the additive.
**These coatings cure tack-free. The remaining acid and additive-containing coatings are only slightly tacky and are substantially less tacky than the control.

EXAMPLE 3

Polylite 31–583 (a polyester resin available from Reichhold Chemical Co.) and Laminac 4104 (a polyester resin available from American Cyanamid Co.) are modified by the addition of 10 parts acrylic acid and 5 parts zinc oxide to 85 parts resin (1.13 moles of acid per mole of zinc oxide). The resulting formulations are then coated on plywood, cured and tested as described in Example 1(a). Unmodified Polylite 31–583 requires 5 passes (8.5 megarads) to cure, but only 3 passes (5.1 megarads) after modification. Unmodified Laminac 4104 requires 6 passes (10.2 megarads), but only three passes (5.1 megarads) after modification. These polyester resins, unmodified, also blister during curing as a result of the heat generated during irradiation. No blistering is noted during curing of the modified resins.

EXAMPLE 4

The base formulation of Example 1(a) has a Brookfield viscosity of 1950 cps. at 25°C. A mixture of 91.6 parts of this formulation, 3.0 parts ZnO and 5.4 parts of acrylic acid has a Brookfield viscosity of over 100,000 cps. On a Haake Rotovisco Viscometer the viscosity ranges from 30,000 cps. at low shear (3.6 r.p.m.) to 11,000 cps. at high shear (97 r.p.m.). The mixture is spreadable with a laboratory roll coater under mild shear conditions.

EXAMPLE 5

The base formulation of Example 1(a) (91 parts) is mixed with three parts magnesium oxide and six parts methacrylic acid. The resulting formulation has a Brookfield viscosity of 100,000+ cps. A coating is spread, cured, and tested as described in Example 1(a).

A hard coating is obtained after 2 passes (3.4 megarads).

EXAMPLE 6 a. A solution of 0.5 parts benzoin in 99.5 parts Hetron 92 (trademark of Hooker Chemical Co.), an unsaturated polyester resin in styrene monomer is coated 0.002-inch thick on tinfoil. The coated foil is passed back and forth at 50 feet per minute 6 inches under a 12-inch long, 1200 watt Hanovia high-intensity mercury ultraviolet light tube equipped with a 4-inch wide reflector. After 36 passes (10.8 seconds exposure), the coating is still wet and uncured.

b. A mixture of 84.5 parts Hetron 92 (determined to have an acid number of about 26), 0.5 parts benzoin, 10 parts acrylic acid and 5 parts magnesium oxide was prepared. The mixture became hard and unusable within several minutes.

c. A mixture of 84.5 parts Hetron 92, 0.5 parts benzoin, 10 parts acrylic acid and 5 parts zinc oxide is coated and exposed to ultraviolet light as in (a). The coating is hard and free of surface tackiness after 10 passes (3 seconds exposure). Addition of 1% benzoyl peroxide to the mixture reduces the cure time to 6 passes (1.8 seconds exposure).

What is claimed is:

1. A thixotropic coating composition curable by exposure to high-energy radiation produced by incorporating into a hydrophobic, essentially solvent-free resin that is liquid at ambient temperature, curable by exposure to high-energy radiation and essentially free of reactive carboxylic acid groups (1) an additive selected from the group consisting of ZnO, MgO, CaO, SrO, BaO, HgO, PbO, $Pb_3O_4$, CuO, CdO, NiO, $Sb_2O_3$, $MnO_2$, $SnO_2$, $ZrO_2$, $Fe_2O_3$, $Co_2O_3$, alkali metal oxides and the hydroxides corresponding thereto, said additive being dispersible in said resin in a finely divided state and (2) an acid selected from the group consisting of acrylic acid and methacrylic acid, said additive being reactive with said acid to form a metal salt thereof and water, the amount of said additive being at least 3% by weight of said composition and the amount of said acid being at least the lesser of 0.3 mole per equivalent of said additive and 0.5% by weight of said composition, the amounts of said additive and acid being sufficient to render said composition thixotropic.

2. The composition of claim 1 wherein said acid is acrylic acid.

3. The composition of claim 1 wherein said additive is selected from the group consisting of ZnO, MgO, PbO, CaO, SrO, BaO, HgO, $Pb_3O_4$ and hydroxides corresponding thereto.

4. The composition of claim 3 wherein said acid is acrylic acid.

5. The composition of claim 1 wherein said additive is ZnO.

6. The composition of claim 5 wherein said acid is acrylic acid.

7. The composition of claim 1 wherein said resin comprises an acrylate ester resin produced by reacting a half-ester of a 2-hydroxaylkyl acrylate or 2-hydroxalkyl methacrylate and a dibasic acid with a polyepoxide.

8. The composition of claim 7 wherein said acid is acrylic acid.

9. The composition of claim 7 wherein said additive is selected from the group consisting of ZnO, MgO, PbO, CaO, SrO, BaO, HgO, $Pb_3O_4$ and hydroxides corresponding thereto.

10. The composition of claim 9 wherein said acid is acrylic acid.

11. The composition of claim 7 wherein said additive is ZnO.

12. The composition of claim 11 wherein said acid is acrylic acid.

13. The composition of claim 1 wherein at least 1.0 mole of said acid per equivalent of said additive is incorporated into said vehicle.

14. The composition of claim 1 wherein the amount of said additive is at least 3 by weight of said composition.

15. The composition of claim 14 wherein the amount of said acid is at least the lesser of 0.3 mole per equivalent of said additive and 0.5% by weight of said composition.

16. The composition of claim 14 wherein at least 1.0 mole of said acid per equivalent of said additive is incorporated into said vehicle.

17. The composition of claim 1 wherein said resin comprises an acrylate ester resin produced by reacting a polyfunctional material selected from the group consisting of (a) dicarboxylic acids and dicarboxylic acid chlorides having from 4 to 15 carbon atoms, and (b) polyfunctional isocyanates having terminal, reactive isocyanate groups with a compound selected from the group consisting of 2-hydroxyalkyl acrylates and 2-hydroxyalkyl methacrylates.

* * * * *